United States Patent [19]

Linwood et al.

[11] Patent Number: 5,027,314

[45] Date of Patent: Jun. 25, 1991

[54] APPARATUS AND METHOD FOR POSITION REPORTING

[75] Inventors: Gary Linwood; Wayne Duncan, both of Newark, Del.

[73] Assignee: United Manufacturing Co., Inc., New Castle, Del.

[21] Appl. No.: 490,144

[22] Filed: Mar. 7, 1990

Related U.S. Application Data

[63] Continuation of Ser. No. 194,199, May 16, 1988, abandoned, which is a continuation-in-part of Ser. No. 169,285, Mar. 17, 1988, abandoned.

[51] Int. Cl.$^5$ .................. G06F 1/00; G08B 23/00; G08B 5/22
[52] U.S. Cl. .................. 364/900; 340/573; 340/825.36
[58] Field of Search ........... 340/573, 825.36, 825.44, 340/825.49, 825.52, 825.54; 379/38; 364/200 MS File, 900 MS File, 403; 235/375, 385

[56] References Cited

U.S. PATENT DOCUMENTS

| | | | |
|---|---|---|---|
| 3,439,320 | 4/1969 | Ward | 340/825.49 |
| 4,225,953 | 9/1980 | Simon et al. | 340/825.49 |
| 4,275,385 | 6/1981 | White | 340/312 |
| 4,471,345 | 9/1984 | Barrett | 340/825.32 |
| 4,495,496 | 1/1985 | Miller | 340/825.54 |
| 4,598,272 | 7/1986 | Cox | 340/825.49 |
| 4,598,275 | 7/1986 | Ross et al. | 340/573 |
| 4,601,064 | 7/1986 | Shipley | 340/825.44 |
| 4,649,385 | 3/1987 | Aires et al. | 379/57 |
| 4,656,463 | 4/1987 | Anders et al. | 340/572 |
| 4,709,330 | 11/1987 | Yokoi et al. | 340/573 |

Primary Examiner—Gary V. Harkcom
Assistant Examiner—John A. Merecki
Attorney, Agent, or Firm—Woodcock, Washburn, Kurtz, Mackiewicz & Norris

[57] ABSTRACT

A system and method for tracking a number of subjects in a plurality of areas is shown to include a plurality of transmitters, wherein at least one transmitter is associated with each subject, each transmitter transmits a light based signal representative of an identifying code unique to that transmitter, a plurality of receivers, wherein at least one receiver is associated with each area, each receiver converts transmitted light based signals to electrical signals and validates the electrical signal to determine whether such electrical signals are representative of the unique identifying codes associated with the transmitters, and a central processing member, connected to each of the receivers, for recording those electrical signals which are representative of the unique identifying codes for recording the receiver which determined that such electrical signals are representative of the unique identifying codes associated with the transmitters and for determining in which area the transmitter is actually located.

12 Claims, 5 Drawing Sheets

APPARATUS AND METHOD FOR POSITION REPORTING

This is a continuation of application Ser. No. 07/194,199, filed May 16, 1988, now abandoned, which was a continuation-in-part of applicaton Ser. No. 07/169,285, filed Mar. 17, 1988, now abandoned.

Reference is made to applicants' copending application entitled Apparatus and Method for Varying the Timing of a Control System bearing Ser. No 169,382, filed on Mar. 17, 1988.

The present invention relates to a tracking system for identifying the position of independent subject within designated areas or zones, and is of particular application in remote monitoring and identification of independent subjects within several designated areas of a larger structure and further to tracking systems which accumulate and process the information in a centralized processor.

BACKGROUND OF THE INVENTION

Systems are available for determining the locations of various persons within a multi-area structure. Systems are proposed in which portable transmitters emit coded signals in predetermined intervals to a central receiving station so as to identify the sending portable transmitter. These systems have certain drawbacks and deficiencies, such as requiring a transmission to the portable unit from the receiving station. Also they are complicated and require cumbersome apparatus.

OBJECTS

It is an object of the present invention to provide a system which can track several subjects, such as people, within several areas, such as rooms, within a large structure all at the same time by independent transmission o signals but without interference between the various tracking signals.

It is an object to provide a system in which a plurality of personal transmitters are constantly monitored and identified by transmission to a central processor where the data is used for tasks.

It is a further object to identify the location of individuals by a simple transmitter carried by each individual, which issues independently and without physical restraint a characteristic and coded identifying signal.

Still another object is the independent transmission of a plurality of distinctively characteristic signals for reception within a receiver network by adapting the timing of the various transmissions.

A still further object is the processing of data on identified independent subjects so as to accumulate information about the subjects in a centralized processor for further processing.

SUMMARY OF THE INVENTION

This is an identification system employing infrared radiation for communication within the system. The communication means are a plurality of individually independent transmitters each issuing a distinctive signal in infrared (IR) radiation. An IR transmitter is described in a copending U.S. application. One or more of these IR transmitters are associated with subjects which are movably positioned in one or more monitored areas or zones. It is a feature of the present system that simultaneous multiple transmissions are possible so that the single system can process the information from several locations and formulate it into a single serial data stream in a central processing unit.

Specifically, an identification means is provided for communication from one or more transmitters associated within a system and movably positioned with respect to each other. It is a feature of the present system that multiple transmissions are possible from a plurality of transmitters so that the single system can process the information from several transmitters.

The system is comprised of a central processing unit, a data processor, which feeds to the CPU serial data on one or more subjects. The data on the subjects originates in IR transmitters, for example as a badge carried on the person and from a location remote to CPU and processor. The transmitter has a clock producing pulses which time the sequencing of pulses to produce a characteristic binary number issued from a light emitting diode in infrared radiation for transmission to a fixed sensor. The sensor on receiving the radiation converts it to electrical signals of ones and zeros and processes the data in a processing unit to identify and validate the characteristic binary number as valid and attributable to a designated transmitter.

The characteristic binary numbers are sent to the central processing unit through the data processor which formulates the bits for processing of the information in the CPU.

In the system of the present invention the uniquely distinctive binary coded characters are transmitted from individually independent portable transmitters by IR radiation to one or more receivers in a receiver network. Data processing means in the receiver network identifies and validates the received binary coded character by comparison with stored reference data. The data from the plurality of transmitters is processed through the data processors and all of the data from the individual transmitters is stored together in an array in a main central processing unit. The accumulated data in the main CPU is available for further processing such as identification of the location of the individual transmitters, statistical analysis and print-outs.

Thus this system provides a plurality of individually independent and therefore autonomous portable transmitters capable of readily changing position within a plurality of areas each of which emits a unique code and the plurality of transmissions are processed after validation and stored together in an array from which accumulation the coded data in available for use in many tasks of computations.

BRIEF DESCRIPTION OF THE DRAWINGS

The principles and above mentioned advantages and objects of the present invention will be better understood upon reading of the following description together with the accompanying drawings in which.

DEFINITIONS

The following are definitions of terms as used herein;

comparator—a unit that compares two binary numbers telling whether the numbers are equal, one-greater-than-the-other or visaversa.

counter—a special kind of register made up of flip-flop circuits with one input and usually an output from each flip-flip, which counts pulses arriving at the input and stores the total count in a certain code (usually binary numbers).

clock input—an input terminal on a unit typically used for receiving a timing control-clock signal, but used in some applications for a control signal or even data.

programmable—a circuit which can be set with a fixed program.

cycle—an interval of space or time in which one set of events or phenomena is completed.

code—a set of meanings assigned to groups of bits made up of binary representations or binary states provided by a sequence of high and low voltage areas.

character—symbol used as part of organization, control or representation of data.

Binary number—number using base 2 and consisting of the digits 0 and 1.

bit—a 0 or a 1.

Clock—a circuit that generates a series of evenly spaced pulses and in a microprocessor causes the microprocessor to proceed from one step to the next in executing instructions.

DETAILED DESCRIPTION OF THE PREFERRED EMBODIMENT

Figure 1:
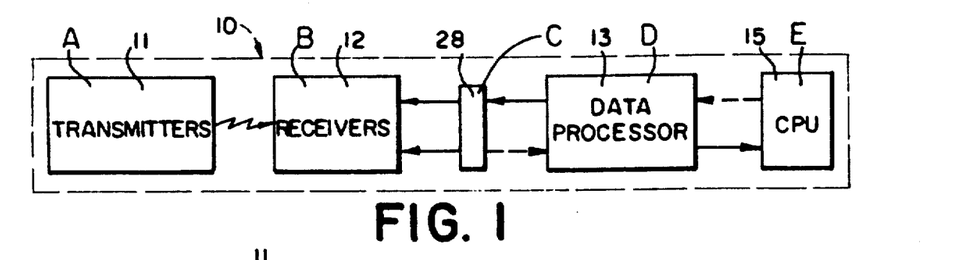
FIG. 1 is a functional block diagram of the system of the present invention.

Referring first to FIG. 1, a system 10 of the present invention is illustrated with a block A representing two or more transmitter assemblies 11, a block B representing at least one receiver assembly 12, a block C representing one or more multiplexers 28 at least one data processor stage 13 represented by block D which is connected by lines 80a and 80b to a central processing unit 15 represented by block E, hereinafter referred to as CPU. Stated briefly, in an arrangement of these parts the transmitters 11 are individually independent and in a portable form, such as a badge, and are associated when in use primarily with subjects. One or more receivers 12 are each located in a designated area or zone so that within this zone one or more transmitters from the transmitter stage and their associated subjects within the transmission range are identified by the operation of the system through the respective receiver 12. The data processor 13 is positioned to receive signals from the receivers 12, and through the interface of the multiplexer 28, sends signals to and receives signals from the CPU 15.

The system 10 provides a network which operates to monitor and identify from a remote location the positioning and location of one or more subjects within one or more designated zones. The transmitters 11 in a preferred embodiment, are badge-size infra-red radiation emitting transmitters. A coded binary number identification signal is produced in each transmitter 11 and is transmitted via infrared radiation to the receiver 12.

Figure 2:
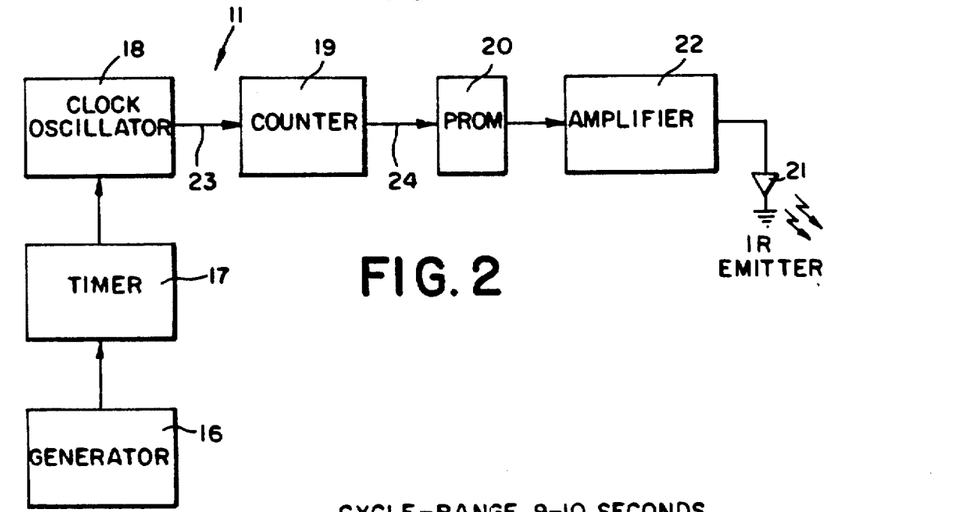
FIG. 2 is a functional block diagram of a transmitter of the system shown in FIG. 1 according to the present invention.

FIG. 2 illustrates in a block diagram a typical transmitter assembly 11 of the transmitter stage illustrated in FIG. 1. In one embodiment this is a pocket-sized device passively carried by each individual in the system. The assembly includes a random time variable generator 16 which provides a signal to a timer 17 and which initiates an operation of the transmitter assembly 11.

The initiation of the timer 17 is under the control of the generator 16 and the operation of a voltage level provided by light incident on the assembly. The timing of the occurrence of the signal from the generator 16 is proportional to the incident light. Thus the generator introduces a random time variable resulting from the conventional variations in ambient light in the area. The timer It periodically creates the cycle of pulses of the assembly by sending out a periodic pulse.

The periodic pulse is set to occur at predetermined points in time, such as once every ten seconds, and thus define a cycle. In the present embodiment the timing of the frequency of the pulse can be varied over a range of from once every second to once every 10 seconds with commensurate cycle duration. The timer It actuates a clock oscillator lB in each cycle. The clock oscillator 18 is gated by the pulses from its clock to provide sequencing of a counter 19 associated with a programmable read-only-memory 20, hereinafter referred to as PROM 20. The PROM 20 is programmed with a specific bit pattern which will generate a unique code in a binary number to be transmitted from the transmitter 11. The coded word is in the form of a binary number. The binary character is stored in memory by the program in the PROM 20 to identify the individual transmitter assembly. The PROM 20 is provided with means for easily programming into the PROM 20 an individual and unique code for the respective transmitter assembly 11.

The characteristic binary number of the transmitter unique code is read out of the memory by the sequencing of the memory addresses by the counter. The counter 19 and the PROM 20 when energized by the pulses from the clock oscillator 18 progress through the active interval, 30 milliseconds in the preferred embodiment and then shuts off. The cycle continues for the remainder of the 10 second period. This binary number is transmitted to an infrared emitter 21 through suitable amplifier 22. Emitter 21 which is driven by transistors in the amplifier 2 converts the electrical signals making up the code of the binary numbers into signals of infra-red radiation. This signal emission from the emitter 21 is in a wavelength of from 900 to 10.000 nanometers and an illustrative pulsing frequency is 1.2 milliseconds or 833 pulses/second. The binary numbers making up the binary character are formed by changes in state.

Data is transmitted as a fixed-length stream of binary digits (bits) concatenated to form one or more binary characters. Each bit is weighted according to its position within a character in binary fashion. The bit length is defined by the "bit cell" time which is nominally 1200 microseconds. Data is encoded in a so-called biphase which is defined as follows:

A binary "1" or "logic high" bit is represented by a transition of the signal level from a "0" or logic low voltage level to a "I" or logic high voltage level at the nominal center of a bit cell.

A binary "0" or "low" bit is represented by a transition of the signal level from a "1" or logic high voltage level to a "0" or logic low voltage level at the nominal center of a bit cell.

The transmitter utilizes an amplitude-shift-keyed modulation technique with a nominal carrier frequency of 38 kilohertz and a data rate of 833 hertz. A logical "0" and a logical "1" are defined by the modulation of the carrier.

In the preferred embodiment, zeroes and ones are transmitted by the radiation from emitter 21 in on-and-off pulses of the infra-red radiation emitting emitter 21.

Figure 3:
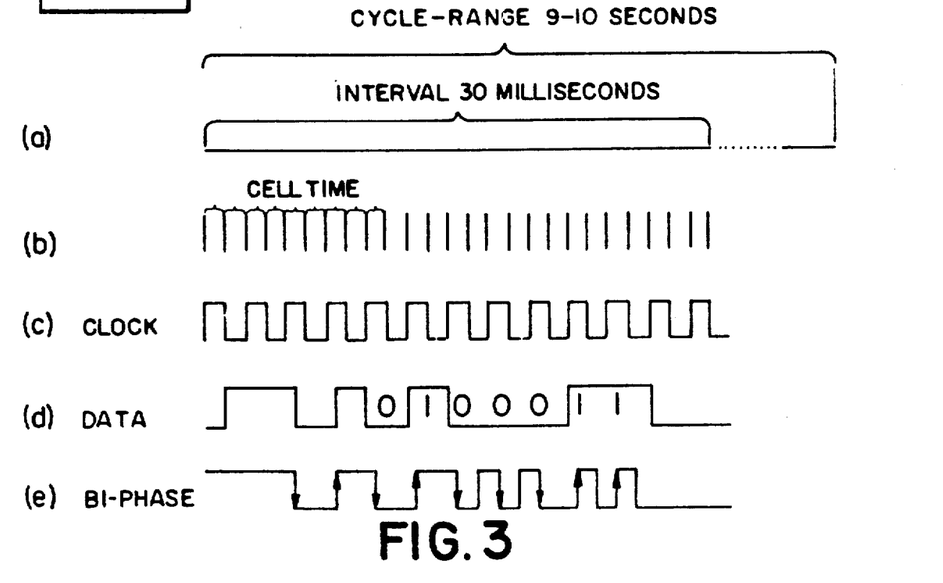
FIG. 3 is a timing diagram with graphs showing the cycle of operation and the transmission intervals of the bi-phase method for data formation and graphs of the relevant functions in this method.

Referring to FIG. 3 this is a diagram charting graphs of the pulses in an active interval in a transmission cycle of the transmitter 11 assembly which occurs upon actuation of the timer 17 by the operation of a voltage level in the variable time generator 16. It will be readily understood that this active interval as described herein is representative of the actuation in any one of a plurality of transmitter assemblies which are coded with similar cycles of transmission of uniquely coded characters to a common receiver, as explained in greater detail below. The active interval makes up the part of recurring transmission cycle. In this active interval the assembly produces and sends coded characters. With the actuation in the generator 16 of an enabling current and a triggering of the transmission cycle and of the active interval, the timer 12 pulses the clock and these clock pulses are delivered to the oscillator 18. The clock pulses span the active interval. The oscillator 18 initiates and sustains a carrier frequency delivered. These clock pulses are delivered from the oscillator 1B to the counter 19 on line 23. In the present embodiment a suitable carrier frequency is 38 Kc. The counter 19 provides an output in the active interval over address lines 24 to the PRO 15.

The signals from the counter 19 sequence the addresses of the PROM 20 to read out the data stored in the addresses by the programming of the PROM 20. A carrier frequency is provided in the PROM 20 for providing the data carrying bits. Each pulse from counter 19 is related to modulation of the carrier frequency. As noted above, the data is ones and zeroes as encoded by transitions. The data in the addresses is written out by transitions of signal levels from logic high to logic low or vice versa.

Figure 4:
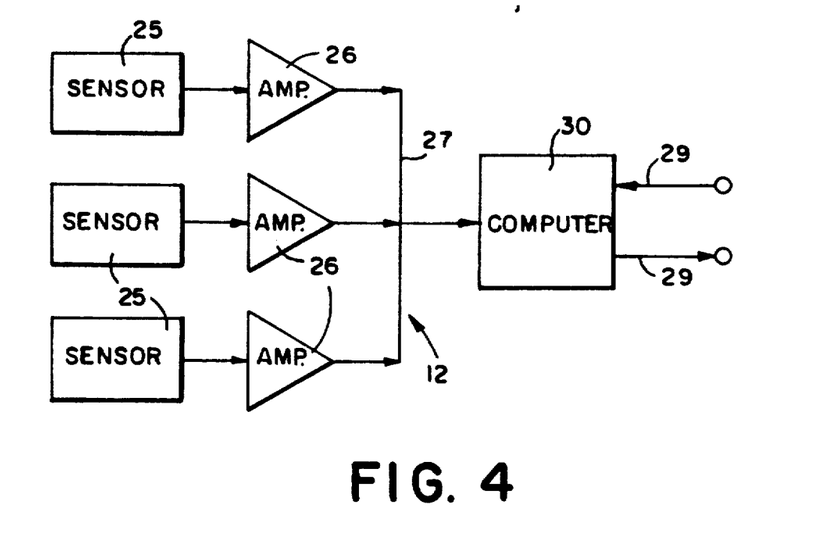
FIG. 4 is a functional block diagram of a receiver of the system shown in FIG. 1 according to the present invention.

The infrared radiation transmitter from the transmitters 11 is received by sensors 25 in the receiver assembly 12 as shown in FIG. 4. According to one aspect of invention the receiver 12 has several sensors 25. As illustrated in FIG. 4 the receiver 12 has three sensors 25 each connected thru amplifiers 26 into a bus 27 which connects to computer 30. Typically one receiver 12 service and receive transmissions from a plurality of transmitters 11 in a designated zone. Computer 30 decodes the binary numbered code output of amplifiers 26 and validates the code by comparison with information stored in the computer 30 memory.

The receiver assembly 12 by operation of the program in the computer 30 receives, synchronizes and decodes the transmitted data from each of the transmitters 12 in the designated area. The processed data is relayed to the data processor 13, shown in FIG. 5.

The data is stored in the memory of the main computer 15 until software routines call for the data to be utilized in subsequent operations.

Figure 5:
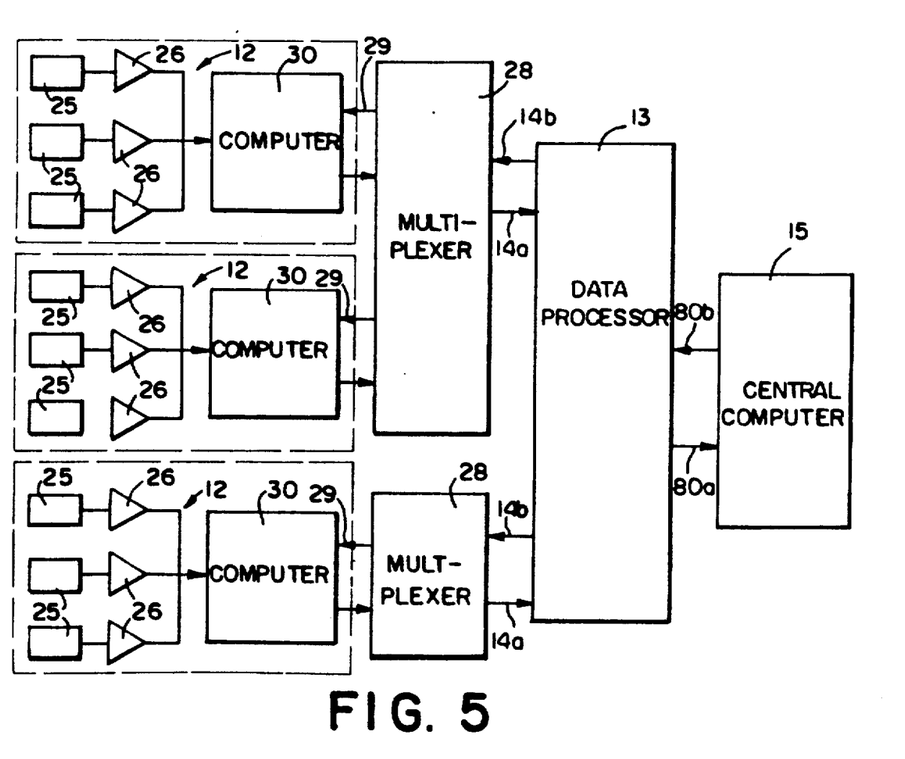
FIG. 5 is a functional block diagram of a plurality of receiver stations and data processors and a central processing unit of the system of FIG. 1 according to this invention.

As shown in FIG. 5, sensors 25 detect infra-red signals within a given frequency band for such radiation and convert the infrared radiation into an electrical signal. As will be understood, the electrical signal represents the coded binary number transmitted by one of the transmitters 11. Each amplifier 26 amplifies electrical signals and the computer 30 converts the encoded bit stream to a binary non-return-to zero bit stream and also provides synchronizing clock signal.

The computer 30 sends a signal 2 data processor 13 on line 38 indicating a binary number identifying code for transmission. The processor 13 returns a clock pulse on line 29 to the computer 30. The computer 30 then sends the converted serial data stream through multiplexer 28 to the processor 13, as shown in FIG. 5.

The data processor 13 accepts serial data streams from a plurality of receivers 12. The multiple receiver data streams are processed in the processor 13. For example, the codes can be validated again by comparison with information programmed into the computer memory. The multiple receiver data stream are combined into a single standard data stream so as to be compatible with processing in the CPU 15. This data stream is transmitted to the CPU 15 on line 27.

In FIG. 5 a functional block diagram illustrates a representative system according to the present invention in which three receiver assemblies 12 are defined by broken lines. Each of the three assemblies 12 contains sensors 25 and amplifiers 26 connected to its respective computer 30. Each receiver 12 is connected to a multiplexer 28 by lines 29a and 29b which are illustrative of the two way transmission between receivers 12 and the processing of the data in the data processors 13 and the host CPU 15. The multiplexers 28 provide the interface between the receivers 12 and the data processor 13. It will be readily understood that the multiple receivers 12 illustrated in FIG. 5 are representative of the variable number of receivers 12 which may be assembled in the system 10 according to the present invention. Further as shown in FIG. 5 one or more receivers 12 may be connected to one or more multiplexers 28 by the respective lines 29a and 29b. In turn the multiplexer 28 are connected to the data processor 13. As explained in greater detail below under the program of the system 10 the data processor 13 processes the data initially generated at the transmitters 11 and transmitted to the receiver 12.

The data processor 13 handles the data from the receivers 12 passed by means of multiplexers 28. As described above and explained in greater detail below the data processor is connected to the main or host CPU 15 by lines 80a and 80b for transmitting data to the CPU 15 and receiving commands from the CPU 15.

As shown in FIG. 4, the CPU 15 typically receives data from more than one data processor 13 and accordingly handles a large number of transmitters from one up to several designated zones. In one embodiment the CPU 15 handles from 250 to 300 receiver assemblies and a consequently larger number of transmitters. The CPU 15 can remove false data and can change the validated code data.

In the timing diagram of FIG. 3, the uppermost graph (a) illustrates the cycle of transmission and the active interval within the cycle. The cycle is represented as 10 seconds in length and the active interval 30 milliseconds. The next graph (b) illustrates the individual cell times of 1.2 milliseconds each. Thus in the embodiment the 30 millisecond active interval is made up of 25 cells, which define the bit lengths. The cell times represent the timing in the formulating and transmission of the binary characters.

The graph (c) represents the train of clock pulses which as the diagram of FIG. 3 shows are synchronized with the cell times. Accordingly, in the embodiment of this detailed description, the active interval has 13 pulse separated by 12 spacing interims to equal the 25 cell times of the illustrated active interval. Graph (d) illustrates the bits representing binary character consisting a string of ones and zeroes. Graph (e) illustrates in a graphic manner the charge states of the circuitry in the PROM 20 in accordance with the coded bi-phase data which in turn provide the binary code of the binary characters illustrated in graph (d). The vertical lines carrying arrows represent transitions of signal level. The horizontal lines represent states of voltage level. The upward pointing arrows signify a transition from low voltage level to high voltage level and the downward pointing arrows vice versa; correspondingly the upper horizontal lines in the cell times represent "ones" or "I" and the lower horizontal lines in a cell times represent "zeroes" or "0". The transitions are peculiar to the coded characteristic binary number of the individual Transmitter assembly 11. They are produced by the data read out of the PROM 20 addresses as the counter 19 sequences the data containing addresses in the PROM 20. Thus it is seen that the coded data programmed into the PROM 15 of an individual transmitter 11 is read out to make up the characteristic coded binary numbers of the individual transmitter 11. As described above, these signals suitably amplified are sent out from IR emitter for reception and detection, as in the receiver 12.

This reading out and sending of the infrared signal occurs during the active interval illustrated in graph (a) of FIG. 3. Thus transmission occupies a minor sector of the transmission cycle. The relative greater length of the time of the cycle accommodates variations of the timing of the active interval within the cycle.

Each receiver 12 constantly monitors the output of its sensors 25 in the receiver computer 30 waiting for a transition in voltage level which may indicate the start of a transmission from one of the transmitters in an area monitored by the receiver 12. To identify the initiation of such a transmission the code provides a characteristic bit signal. As illustrated in the data graph (d) of FIG. 3 the first bit is 3 milliseconds long. The computer 30 is programmed to recognize this as identifying the start of the transmission of a coded binary number, which follows as illustrated in graph (d) of FIG. 3. The receiver 12 then reads in the bits from a transmitter 11 which make up the unique binary number.

The computer 30 on receiving the characteristic bits identifies the code number being transmitted. When the coded binary number has been assembled in the computer 30 it is ready for validation by a comparison. The matching code number is read in from the computer memory. In one comparison method the data from the transmitter 11 is read into a register not shown and the data the transmitter 11 is read into a register not shown and the data from memory into a register not shown. After the values are entered a comparison of the values is made by subtraction. If a match of values is indicated the receiver 12 recognizes the transmission as a valid one. The receiver 12 goes thru isolation to report to the main CPU 15 thru the data processor that a value data transmission has been made.

As indicated by the graph of FIG. 3 the clock signal and the data signal ar synchronized. This is achieved by 12 locking on to the transmission.

The identification signal validated by computer 30 is transmitted from the receiver 12 to the data processor 13. The computer of the data processor 13 constantly monitors all receivers 12 connected to it. When any one of the receivers signals that it has an identification signal, i.e., a badge code, the data processor 13 reads that code from the receiver and stores it in RAM memory. All transmissions from receivers are stored together this way in a large array. The data processor 13 is also continuously watching for a signal from the CPU 15 which will indicate a request for the data which has been accumulated.

The main CPU IS cycles through several different tasks. The only task that is required for system operation is the requesting of data from the data processor 13. When data is requested from the data processing computer, the data processing computer sends the entire array of data back to the main CPU 25. At this point, anything may be done with the data that the use requires.

In the operation of the present invention the accumulation of data relating to a number of subjects is possible. An advantage of the invention is a constant monitoring of a number of transmitters which are positioned both in common areas and in separate areas and which are portable and not mechanically attached to the receiver but are individually independent.

Figure 6A:
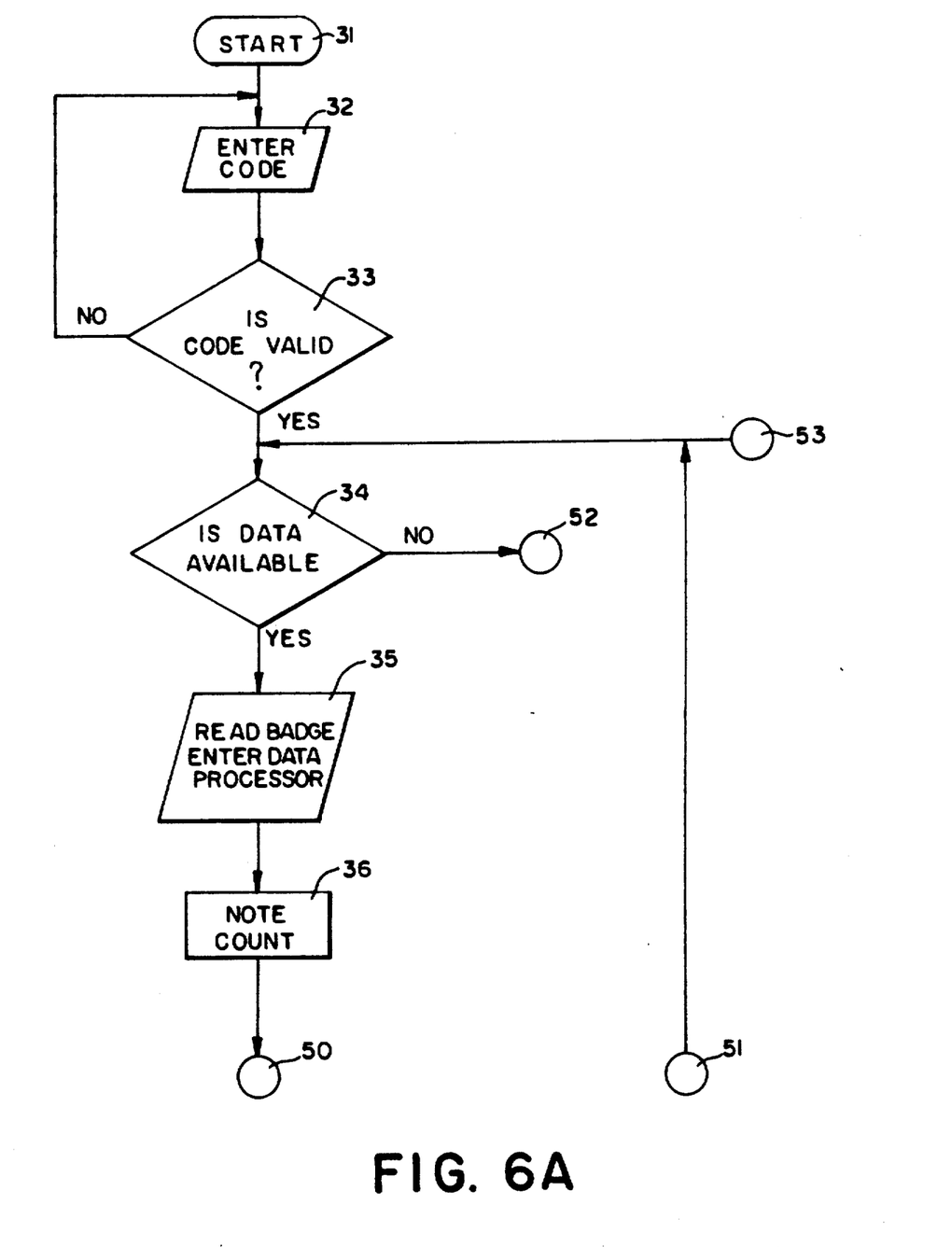
FIGS. 6A, 6B and 7 are flow charts diagramming an operation of the system.

The operational sequence of the system is illustrated by the flow sheet of FIG. 6. The initiation of the operation as represented by the oval 31. The transmitter assemblies II and the receiver assemblies 12 are energized; this function is indicated diagrammatically by oval 31. The circuitry is now prepared for the transmission and entry of badge numbers associated with the transmitter assemblies 11 to identify the location of subjects. The entry of a badge number by the transmission of a coded binary number code from a transmitter 11 to a receiver is represented in the flow chart by the parallelogram 32.

This actuation of a number code by a transmitter 11 for transmission leads to the determination whether the actuation is of a number code of the system, i.e., validation. This decision point is represented by the diamond 33. The determination is made by the procedures described herein. For example, the characteristic binary number issued from an emitter 21 is converted into electrical signals in the binary of ones and zeroes and the data processed and validated as an authentic binary number by comparison with stored data. It is representative of the multiple actuation and transmissions from the several transmitters 11 of the system, during the monitoring operation.

The negative branch of the diamond 33 carries the identification process back to the actuation of another transmission.

The affirmative branch of the diamond 33 carries the operation to sensing the presence of badge numbers in one or more receivers 12 available by data processor 13. This determination is represented by the diamond 34 where the question "data available" is conducted by the programming of processor 13. The affirmative branch leads to the program reading a badge number from a receiver 12 into the data processor 13 as represented by parallelogram 35. In reference to the identification of one such located badge number its subject and the room in which it is located the program procedure can be summarized briefly.

The program recognizes the last four areas in which the badge number has been located. As to that selected group of areas the system through the program updates the location of the badge number. The program processes and records each identified and processed badge number within this selected number of areas with the following operations as illustrated by the flow chart of FIGS. 6a and 6b.

Upon the locating of an available data at 34, i.e., badge number in a receiver 12, is read into the data processor, as represented by parallelogram 35. This is followed by a procedure which calls for scanning the four areas for identification and location and/or relocation of the badge number, and its accompanying subject. The next step in the program is noting the count or number of identification of that badge number in the data processor 1 i.e. initializing an array pointer or variable N. This is represented by block 36. The pointer indicates the number of areas in which the badge number has been located and can be referred to as an area count.

The area count having been established, the next step is the determination of whether the area scan associated with the locating procedure for this badge number has inspected more than four areas. This is represented by the diamond 38 in FIG. 6b; note 0 counts as 1.

Figure 6B:
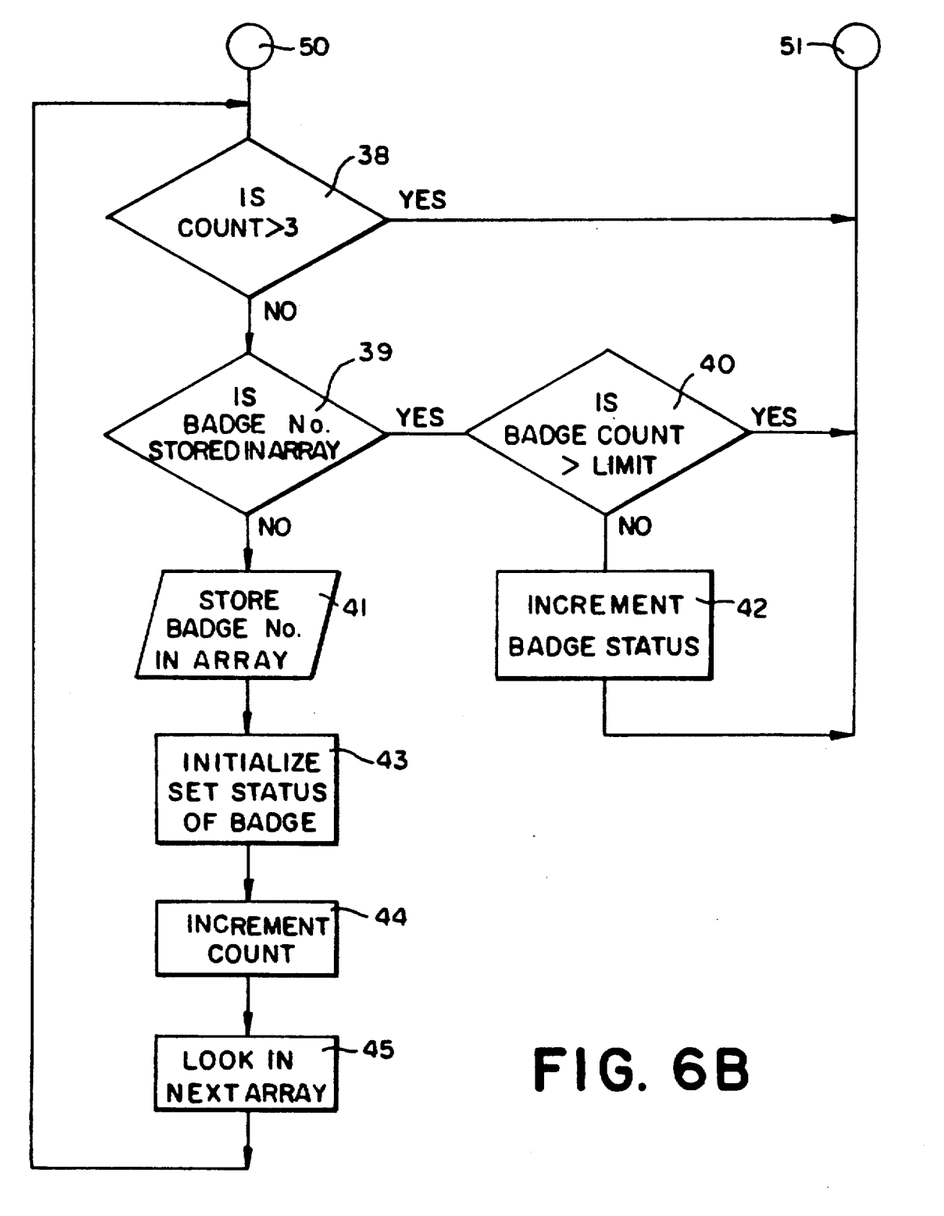

If the area count is greater than 3 the processing loops back to seeking data from the receiver 12 stage. This means that the scan procedure of the selected group has run its course. If the area count is not greater than 3 the procedure branches to storing the badge number in the array correlated to that area, i.e. the room, in which the badge has been located and identified and for searching other areas. The first step in this procedure is the determination of whether the identified badge number is in the first area. This is for the purpose of determining if the badge number is to be stored in the correlated array of that area. This determination is represented by the diamond 39. An affirmative carries the procedure to the determination of whether the number of identifications of that badge number in that array is within a set limit, of seven for example. This· is represented by the diamond 40. If the determination is that less than the limit has been counted, i.e., the badge count for that are is less than a set limit, the procedure branches to block 42, where the badge count is incremented. The steps then proceed to looping back to seeking data from the receivers 12 for entry into the data processor 13.

If the badge count as determined in diamond 40 shows the count of identifications of the specific badge over the limit, then the procedure loops back immediately to the scan for data from the receivers 12.

If the determination at diamond 39 is that the badge number is not in the first of the designated areas then the program stores the badge number in the array for that area at 41, sets the status of the identified badge in the relevant array, i.e., the badge count to one and then increments the count of the areas inspected as represented by block 44. This records in the host CPU IS that one of the four areas has been inspected. Then having failed to initially find that badge number in that inspected area, the scanning procedure calls for looking for the located badge number in the next designated area as represented by the block 45. This leads to looping to the determination whether the locating procedure for this specific badge has inspected more than four areas in the determination of diamond 38 and the procedure described above associated therewith. A negative determination branches to the question as represented by diamond 39. If the count of areas is greater than 3 stated i.e., if four areas have already been inspected, an affirmative results indicating that the scanning step of the group of areas is fulfilled. Then the processing loops back to seeking data from the receiver stage 12.

The negative branch from diamond 38 carries the procedure to inspecting the next designated area and a repetition of the determination in diamond 39 and diamonds 40.

This programmed procedure as outlined above in relation to a badge number identified in one of the monitored areas, i.e. rooms etc. is typical as an example of the tasks performed by the program of the present invention. Thus it will be seen that the program operates to process the identified badge numbers in the monitored areas by first entering the badge number in an address in an array associated with the area where the badge number was identified and then counting and tallying the number of identifications of the badge number in the respective arrays until the limit for the particular badge is attained. Also the program monitors, records and processes in each 10 second cycle the history of each specific badge for the last four areas scanned. When the set limit for locating monitored areas has been reached for all four monitored areas of the sweep, the storing of the badge number is discontinued and in subsequent identification the program loops back through the affirmative branch of diamond 38.

Figure 7:
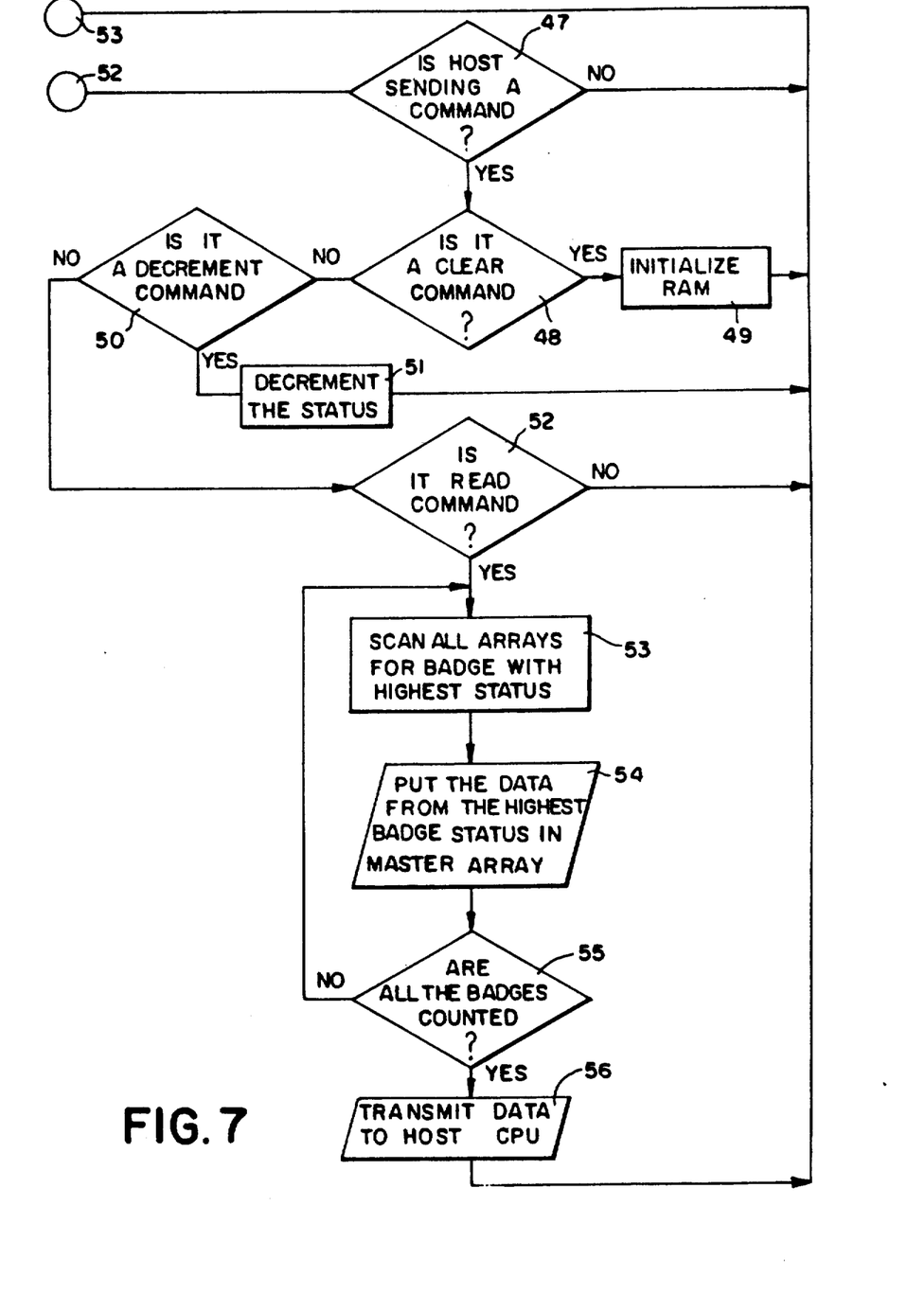

Referring to FIG. 7, when the data processor is not receiving data from the receivers the program branches to check for commands from the main CPU 15. The following steps involve commands from the host CPU 15 which process information on the location of the badges.

The processing identifies commands and executes functions in accordance therewith. FIG. t illustrates such procedures. The first determination is represented by the diamond 47 to which the program branches via the connector 45 with the question, is the CPU 15 sending a command as shown in diamond 47. The negative branch from diamond 47 carries the program back to seeking data from the receivers.

The affirmative branch carries the system to the reception and execution of commands in the program. The next determination is whether there is a CLEAR command as represented by the diamond 48. The affirmative branch from diamond 48 indicating a CLEAR command leads to initializing all the arrays which is a removal or clearing of all data from all the arrays, represented by block 49.

Each array has two halves. One half records the area where the badge is located, the other half keeps track of the count of the identification of the badge.

The negative branch from the diamond 48 indicates that in this time in the procedure the badge is being monitored rather than being stored.

For the purpose of this specific example, in this operation the host CPU is assumed to scan the array every 10 seconds. The command to decrement occurs normally once every 10 cycle. When executed, the command decrements the status of all badges downward. This is represented by block 51.

A negative response in diamond 50 branches to the next determination is there a READ command. This is represented by diamond 52. An affirmative response leads to the function of scanning block 53, all the arrays are scanned for the one having the highest badge status and putting it in a fifth or master array, parallelogram 54. After the master array has been updated the data is transmitted to the host CPU IS as represented by parallelogram 55. Upon completion of the transfer to the host CPU 15 the next determination is whether all of the badges in the system have been check as represented by diamond 56. The negative branches loops back to block 53 and scanning the arrays for the badge with the highest count. The affirmative branch loops to connector 46 and seeking data from the receiver 12.

We claim:

1. A system for tracking a number of subjects in a plurality of areas comprising:
   a plurality of transmitters, wherein at least one transmitter is associated with each of said subjects, each of said transmitters comprising transmission means for transmitting a light based signal representative of an identifying code unique to that transmitter;
   a plurality of receivers, wherein at least one of said receivers is associated with each of said areas, each of said receivers comprising a converter for converting a transmitted light based signal to an electrical signal and a validation circuit for processing said electrical signal to determine whether said electrical signals are representative of the unique identifying codes associated with said transmitters; and
   processor means, connected to each of said receivers, for recording those electrical signals which are representative of said unique identifying codes, for recording the receiver which determined that such electrical signals are representative of the unique identifying codes associated with said transmitters and for determining in which of said areas said transmitters are located, wherein said processor means comprises scanning means for scanning said receivers and accumulating means for accumulating with respect to each transmitter those areas in which receivers have determined that an electrical signal is representative of the unique identifying code associated with that particular transmitter and for accumulating a badge count for each accumulated area, said badge count being representative of the number of times a receiver has determined that an electrical signal is representative of the unique identifying code associated with that particular transmitter.

2. The system of claim 1, wherein said light based signals are infra-red radiation based signal.

3. The system of claim 1, wherein each of said receivers includes at least two converting means for converting transmitted light based signals to electrical signal.

4. The system of claim 1, wherein each of said transmitters is a portable device associated with an individual subject.

5. The system of claim 1 wherein said validation circuit comprises a computer for comparing said electrical signal to a second electrical signal representative of said unique identifying codes.

6. The system of claim 1, wherein said validation circuit comprises a memory for storing said unique identifying codes, and wherein the determination of whether an electrical signal is representative of a unique identifying code associated with said transmitters is achieved by comparing said electrical signal to said unique identifying codes stored in said memory.

7. The system of claim 1, wherein said processor means further comprises comparison means for comparing the accumulated number of areas and said bade counts to respective reference numbers and for generating an indication of such comparisons.

8. The system of claim 1, wherein said processor means further comprises location means for determining the location of said transmitters in relation to the indication from said comparison means.

9. A method for tracking a number of subjects in a plurality of areas in a system wherein at least one transmitter is associated with each of said subjects, each transmitter being capable of transmitting a light based signal representative of an identifying code unique to that transmitter, comprising the steps of:
   converting, in a receiver, the transmitted light based signal to an electrical signal and validating said electrical signal to determine whether said electrical signal is representative of the unique identifying codes associated with said transmitter;
   recording those electrical signals which are representative of said unique identifying codes;
   recording the receiver which determined that such electrical signals are representative of the unique identifying codes associated with said transmitters; and
   determining in which of said areas said transmitters are located, wherein the recording the receiver and the determining steps comprise the steps of scanning said receivers and accumulating with respect to each transmitter those areas in which receivers have determined that an electrical signal is representative of the unique identifying code associated with a particular transmitter and accumulating a badge count for each accumulated area, said badge count being representative of the number of times a receiver has determined that an electrical signal is representative of the unique identifying code associated with the particular transmitter.

10. The method of claim 9, wherein the step of validating the electrical signal comprises the step of comparing said electrical signal to a second electrical signal representative of said unique identifying codes.

11. The method of claim 9, further comprising the steps of comparing the accumulated number of areas and said badge counts to respective reference numbers and generating an indication of such comparisons.

12. The system of claim 11, further comprising the step of determining the location of said transmitters in response to the indication of comparisons.

* * * * *

UNITED STATES PATENT AND TRADEMARK OFFICE
CERTIFICATE OF CORRECTION

PATENT NO. : 5,027,314
DATED : June 25, 1991
INVENTOR(S) : Gary Linwood; Wayne Duncan It is certified that error appears in the above-identified patent and that said Letters Patent is hereby corrected as shown below:

Column 8, Line 13 - "1S" should be typed as "15".

Column 8, Line 31 - "I1" should be typed as "11".

Column 9, Line 57 - "1S" should be typed as "15".

Column 10, Line 36 - after Fig., a "t" appears, instead of a "7". (Patent Office Error)

Column 11, Line 2 - "1S" should be typed as "15". (Patent Office Error)

Signed and Sealed this

Tenth Day of November, 1992

*Attest:*

DOUGLAS B. COMER

*Attesting Officer*     *Acting Commissioner of Patents and Trademarks*